(12) United States Patent
Huang et al.

(10) Patent No.: US 6,525,251 B1
(45) Date of Patent: Feb. 25, 2003

(54) METHOD OF DISPLAYING THE TITLE AND WORDS OF SONGS ON A DIGITAL MUSIC PLAYER

(76) Inventors: Shih Ching Huang, 3FL., No. 12, Alley 34, Lane 385, Hsin Hai Rd., Pan Chiao City, Taipei Hsien (TW); Yun Lun Yang, 3FL., No. 16, Lane 157, Sec. 6, Chung Shan North Rd., Taipei (TW)

(*) Notice: Subject to any disclaimer, the term of this patent is extended or adjusted under 35 U.S.C. 154(b) by 166 days.

(21) Appl. No.: 09/704,618

(22) Filed: Nov. 3, 2000

(51) Int. Cl.7 ............................................. G09B 15/02
(52) U.S. Cl. ................................. 84/477 R; 434/307 A
(58) Field of Search ..................... 434/307 A; 84/600, 84/477 R, 470 R

(56) References Cited

U.S. PATENT DOCUMENTS 5,712,949 A * 1/1998 Kato et al. .................. 386/106
6,278,048 B1 * 8/2001 Lee .......................... 434/307 A
6,328,570 B1 * 12/2001 Ng .......................... 434/307 A

* cited by examiner

*Primary Examiner*—Jeffrey Donels
(74) *Attorney, Agent, or Firm*—Bacon & Thomas

(57) ABSTRACT

A method of displaying the title and words of songs on a portable digital music player includes the steps of using an editing software to edit words of songs into pages, storing the pages of words of the songs in the hard diskdrive of a computer for enabling the computer to automatically display the edited words on the screen when playing the selected song, recording the time for displaying each page of the words of the song played through the computer, driving the computer to store the file after the end of the play of the song, transferring the storage data from the computer to the memory of the portable digital music player, and driving the portable digital music player to display page by page the words of the song being played by the portable digital music player.

3 Claims, 3 Drawing Sheets

METHOD OF DISPLAYING THE TITLE AND WORDS OF SONGS ON A DIGITAL MUSIC PLAYER

BACKGROUND OF THE INVENTION

The present invention relates to a method of displaying the title and words of songs on a portable digital music player, and more particularly to such a method used in a portable digital music player for enabling the portable digital music player to display the title and words of the song being played.

Recently portable digital music players, for example, MP3, have become more and more popular for the advantage of compact size and capable of downloading music from the Internet. However, conventional portable digital music players can only play music, they cannot display the title and words of the song being played.

SUMMARY OF THE INVENTION

The present invention has been accomplished to provide a method, which enables a portable digital music player to display the title and words of the song when playing it. According to the present invention, songs of a music CD are converted into a digital compressive file by a computer converting program, and then stored in the memory of a portable digital music player, and the time for displaying each page of the words of the song played through the computer is recorded and stored in the computer, and then the storage data is transferred from the computer to the portable digital music player. When the user operates the portable digital music player to display a song, the words of the song being played is displayed on the LCD of the portable digital music player page by page.

DETAILED DESCRIPTION OF THE PREFERRED EMBODIMENT

Figure 1:
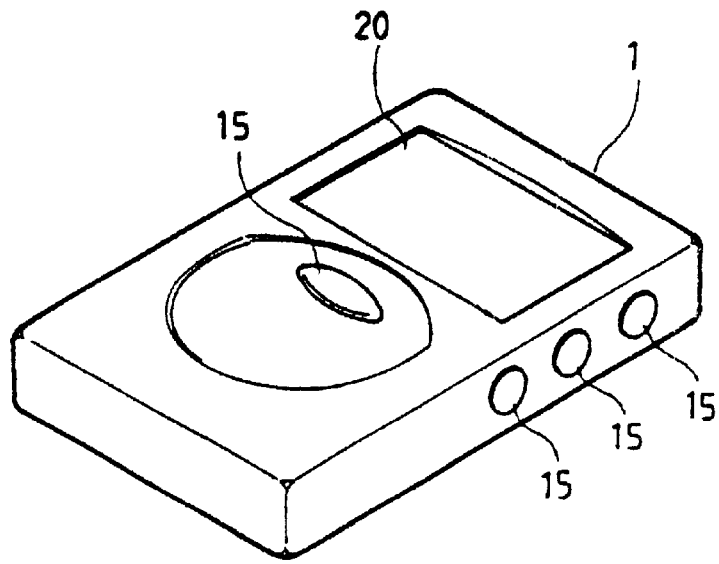
FIGS. 1 and 4 are elevational views of a portable digital music player according to the present invention.
Figure 4:
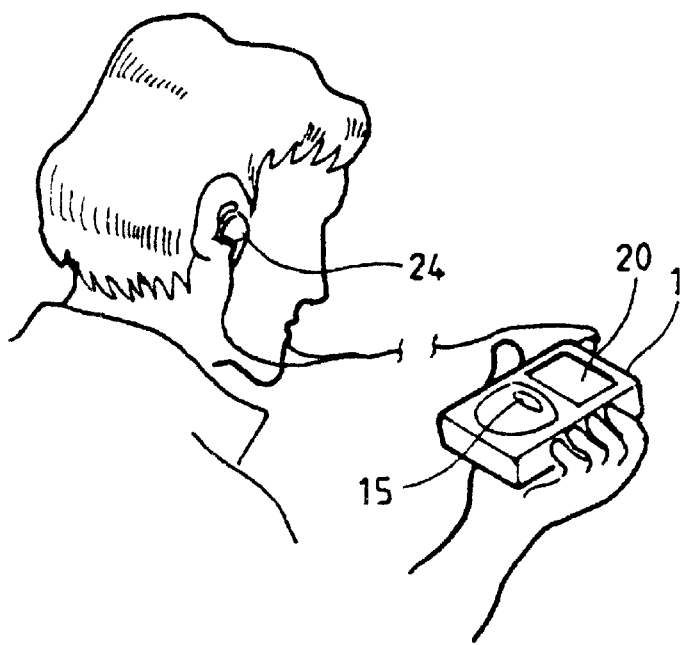
Figure 2:
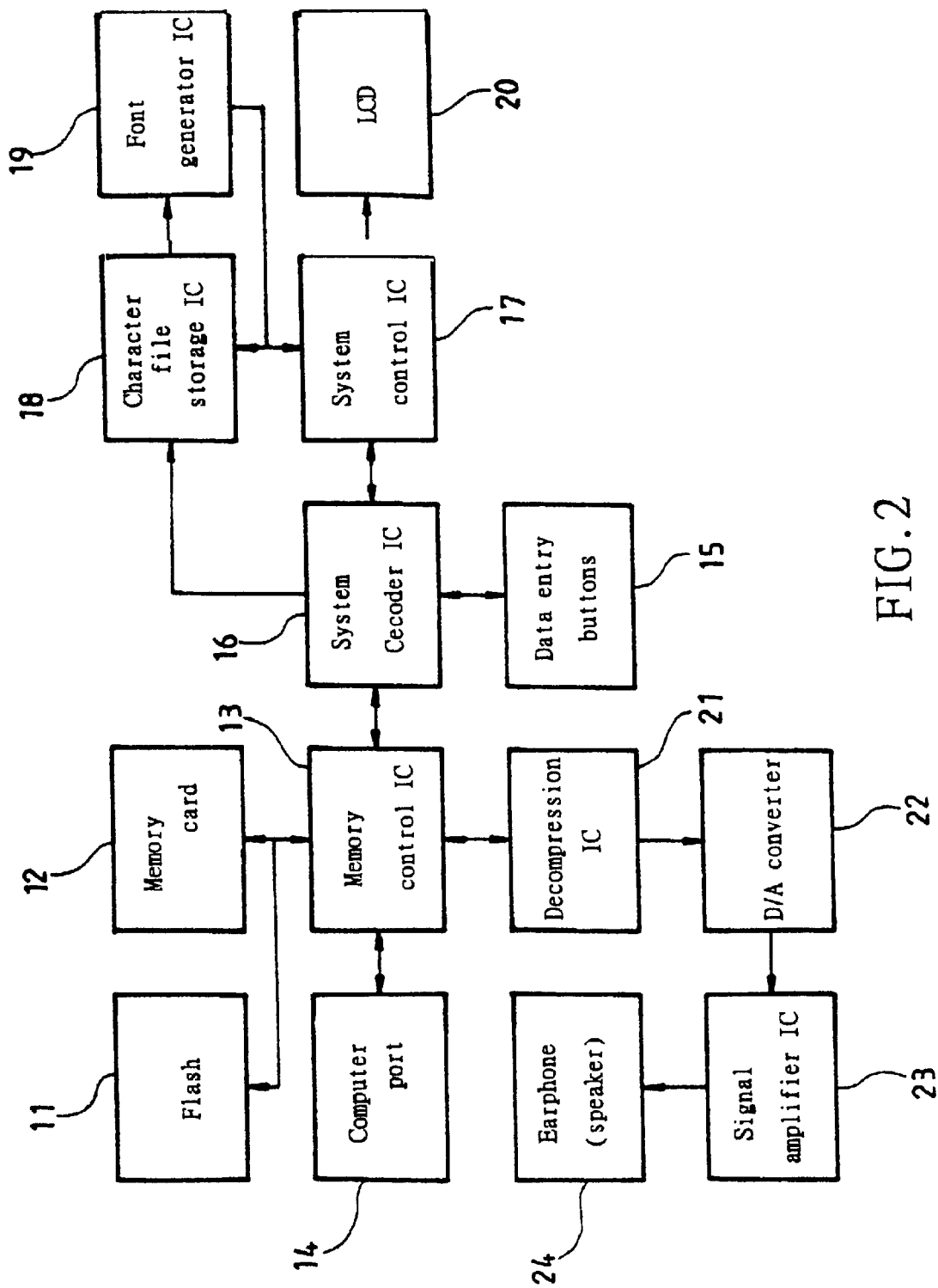
FIG. 2 is a system block diagram of the portable digital music player according to the present invention.

Referring to FIGS. 1 and 2, a portable digital music player 1 has installed therein a flash memory 11 or expansion memory card 12, which is connected to a computer port 14 by means of the control of a memory control IC 13 for the storage of title and words of songs, so that when the user operating the control buttons 15 of the portable digital music player 1, words of the selected song are processed in proper order through a system decoder IC 16, a system control IC 17, a character file storage IC 18 and font generator IC 19, and then displayed on a LCD 20, and at the same time the selected song is processed in proper order through a decompression IC 21, a D/A converter IC 22 and a signal amplifier IC 23, and then outputted through an earphone (or speaker) 24. Therefore, when listening to the song, the user can see the words of the song on the LCD 20.

Figure 3:
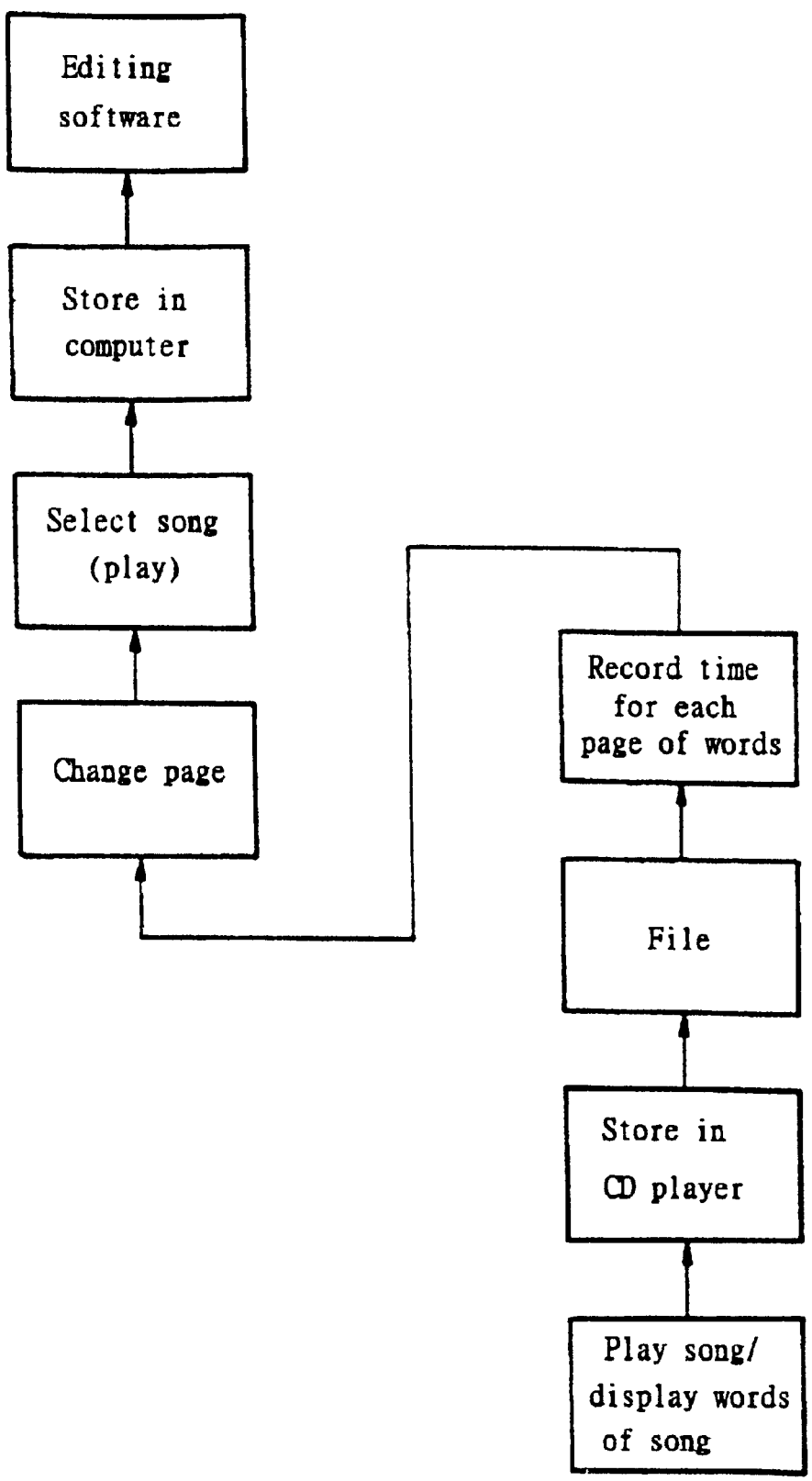
FIG. 3 is an operation flow chart according to the present invention.

Referring to FIG. 3, the method of the present invention comprises the steps of:

1. converting the songs of a music CD into a digitally compressed file made up of music files corresponding to said songs by means of a converting program in a computer, and then storing the digitally compressed file in memory means of the computer;
2. editing the words of the songs of the digital compressive file into sentences displayable on the LCD of a portable digital music player page by page, and then storing the edited pages of words in the hard diskdrive of the computer;
3. connecting the portable digital music player to the computer, and enabling the computer to scan the stored digital compressive file containing said songs, and to play the songs by means of the operation of a music playing software, and to display the edited pages on the screen of the monitor connected to the computer when playing the songs;
4. driving the portable digital music player to display on the LCD of the portable digital music player the words of the song selected by the user from the screen of the monitor of the computer;
5. driving the counting software of the computer to record the time for displaying each page of the words of the song selected by the user after the user operates a page change button;
6. driving the computer to store a display file containing the stored pages of words and the times for displaying each page after the end of the play of the song, enabling the storage data to be transferred to the memory of the portable digital music player.

What the invention claimed is:

1. A method of displaying the title and words of songs on a portable digital music player having a memory, comprising the steps of:
   (a) editing the words of songs into pages of words displayable on the LCD of a portable digital music player page by page, and then storing the edited pages of words in a computer;
   (b) connecting the portable digital music player to the computer, and then driving the computer to scan music files containing songs corresponding to the edited pages of words, and to play the songs in the music files while the user selects pages of words corresponding to portions of the songs;
   (c) driving the counting software of the computer to record respective times for displaying each page of the words of each song selected by the user and played through the computer;
   (d) driving the computer to store a display file containing said edited pages and said recorded times for displaying each page, after the end of the play of each song selected by the user, and transferring the stored display file to the memory of the portable digital music player; and
   (e) driving the portable digital music player to display page by page the words of a song selected by the user when the portable digital music player plays the selected song.

2. The method of claim 1 wherein the memory of said portable digital music player has a character file installed therein adapted for enabling the words of the selected song to be stored in the memory of the portable digital music player when transferring the display file from the computer to the portable digital music player, so that the words of the song can be automatically displayed on the LCD of the portable digital music player when operating the portable digital music play to play the song.

3. The method of claim 1 wherein the memory of said portable digital music player has a character file installed therein adapted for enabling the words of the selected song to be stored in the memory of the portable digital music player when transferring the data from the computer to the portable digital music player, so that the words of the song can be automatically displayed on the LCD of the portable digital music player when operating the portable digital music play to play the song.

* * * * *